(12) United States Patent
Nishii

(10) Patent No.: US 12,171,155 B2
(45) Date of Patent: Dec. 24, 2024

(54) TRAVEL ROUTING AND CONTROL FOR AUTONOMOUS FIELD TRAVEL SYSTEM

(71) Applicant: Yanmar Power Technology Co., Ltd., Osaka (JP)

(72) Inventor: Yasuto Nishii, Osaka (JP)

(73) Assignee: YANMAR POWER TECHNOLOGY CO., LTD., Osaka (JP)

( * ) Notice: Subject to any disclaimer, the term of this patent is extended or adjusted under 35 U.S.C. 154(b) by 373 days.

(21) Appl. No.: 17/425,923

(22) PCT Filed: Dec. 19, 2019

(86) PCT No.: PCT/JP2019/049786
§ 371 (c)(1),
(2) Date: Jul. 26, 2021

(87) PCT Pub. No.: WO2020/158230
PCT Pub. Date: Aug. 6, 2020

(65) Prior Publication Data
US 2022/0159899 A1     May 26, 2022

(30) Foreign Application Priority Data
Jan. 29, 2019   (JP) .................................. 2019-012666

(51) Int. Cl.
*A01B 79/00* (2006.01)
*A01C 11/00* (2006.01)
(Continued)

(52) U.S. Cl.
CPC .......... *A01B 79/005* (2013.01); *A01C 11/006* (2013.01); *G05D 1/0219* (2013.01); *G07C 5/008* (2013.01); *G07C 5/06* (2013.01)

(58) Field of Classification Search
CPC .. A01B 79/005; A01C 11/006; G05D 1/0219; G07C 5/008; G07C 5/06
(Continued)

(56) References Cited

U.S. PATENT DOCUMENTS 8,838,321 B1 * 9/2014 Ferguson ........ B60W 30/18009
340/901
10,834,265 B1 * 11/2020 Antunes .................. H04L 65/80
(Continued)

FOREIGN PATENT DOCUMENTS

JP      10-113318 A      5/1998
JP     H10-113318 A      5/1998
(Continued)

OTHER PUBLICATIONS

International Search Report dated Mar. 17, 2020 issued in corresponding PCT Application PCT/JP2019/049786 cites the patent documents above.
(Continued)

*Primary Examiner* — Richard A Goldman
(74) *Attorney, Agent, or Firm* — NORTON ROSE FULBRIGHT US LLP

(57) ABSTRACT

An autonomous travel system equipped with a first travel route creation unit, a second travel route creation unit, a linked route creation unit, and a storage unit. The first travel route creation unit is capable of creating a first travel route. The second travel route creation unit is capable of creating a second travel route. The linked route creation unit has a function for creating the second travel route in conjunction with the creation of the first travel route by the first travel route creation unit and/or a function for creating the first travel route in conjunction with the creation of the second travel route by the second travel route creation unit. The storage unit stores, in association with each other, the travel
(Continued)

route created by the first travel route creation unit or the second travel route creation unit, and the travel route created by the linked route creation unit.

9 Claims, 11 Drawing Sheets

(51) Int. Cl.
    *G05D 1/00* (2006.01)
    *G07C 5/00* (2006.01)
    *G07C 5/06* (2006.01)

(58) Field of Classification Search
    USPC .......................................................... 701/25
    See application file for complete search history.

(56) References Cited

U.S. PATENT DOCUMENTS

| | | | | |
|---|---|---|---|---|
| 11,673,578 | B2* | 6/2023 | Sarkar | B60W 30/0956 |
| | | | | 701/23 |
| 11,753,040 | B1* | 9/2023 | Gammelgard | G05D 1/0016 |
| | | | | 701/2 |
| 2019/0010924 | A1* | 1/2019 | Theopold | F03D 7/0224 |
| 2019/0146513 | A1* | 5/2019 | Tomita | G05D 1/0088 |
| | | | | 701/50 |
| 2019/0171218 | A1* | 6/2019 | Hammond | G05D 1/0214 |
| 2019/0204850 | A1* | 7/2019 | Panzica | G05D 1/0274 |
| 2019/0346848 | A1* | 11/2019 | Zhou | G05D 1/0268 |
| 2020/0064144 | A1* | 2/2020 | Tomita | A01D 69/00 |
| 2020/0064863 | A1* | 2/2020 | Tomita | G05D 1/0297 |
| 2021/0195823 | A1* | 7/2021 | Yuasa | G05D 1/0278 |
| 2022/0004199 | A1* | 1/2022 | Shoval | G06Q 50/30 |
| 2022/0159899 | A1* | 5/2022 | Nishii | G07C 5/06 |
| 2022/0176991 | A1* | 6/2022 | Kuehner | B60W 10/30 |
| 2022/0348225 | A1* | 11/2022 | Kumano | B60W 60/0015 |
| 2022/0348227 | A1* | 11/2022 | Foster | B60W 30/143 |
| 2023/0017377 | A1* | 1/2023 | Watanabe | G01C 21/3407 |
| 2023/0106644 | A1* | 4/2023 | Shenfeld | B60W 50/14 |
| | | | | 701/26 |
| 2023/0132512 | A1* | 5/2023 | Clawson | B60W 30/095 |
| | | | | 701/26 |
| 2023/0309434 | A1* | 10/2023 | Suzuki | G05D 1/0061 |
| | | | | 701/50 |
| 2023/0315110 | A1* | 10/2023 | Suzuki | G05D 1/0219 |
| | | | | 701/25 |

FOREIGN PATENT DOCUMENTS

| | | | |
|---|---|---|---|
| JP | 2008092818 | A | 4/2008 |
| JP | 2011254704 | A | 12/2011 |
| JP | 4948098 | A | 6/2012 |
| JP | 4948098 | B2 | 6/2012 |
| JP | 2017139982 | A | 8/2017 |
| JP | 2017-211734 | A | 11/2017 |
| JP | 2018000039 | A | 1/2018 |
| JP | 2018004589 | A | 1/2018 |
| JP | 2018121537 | A | 8/2018 |
| JP | 2019004854 | A | 1/2019 |
| JP | 2017134527 | A | 8/2019 |
| KR | 20180087128 | A | 8/2018 |
| WO | 2017159801 | A1 | 9/2017 |

OTHER PUBLICATIONS

European Search Report dated Sep. 21, 2022 issued in EP Application 19912734.1.
Japanese Office Action dated Mar. 8, 2022 issued in JP Application 2019012666.
Japanese Office Action dated Sep. 5, 2023 issued in JP Application 2022115170.

* cited by examiner

FIG. 6
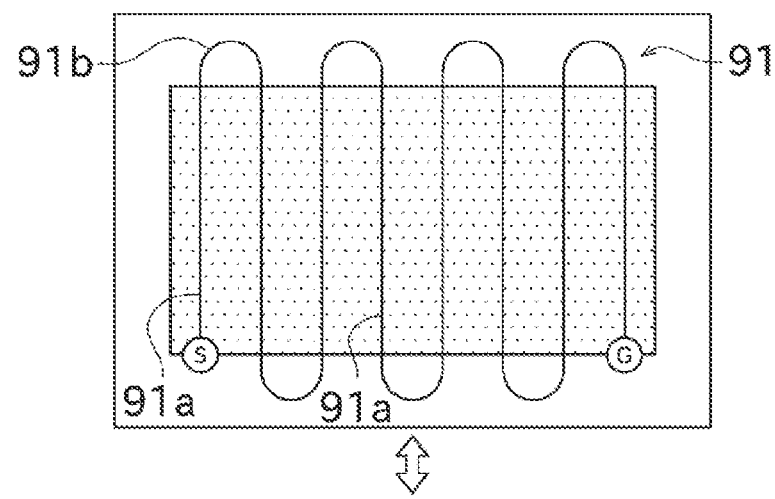
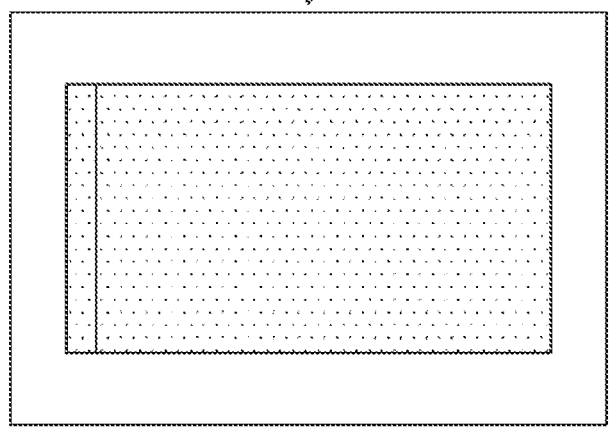
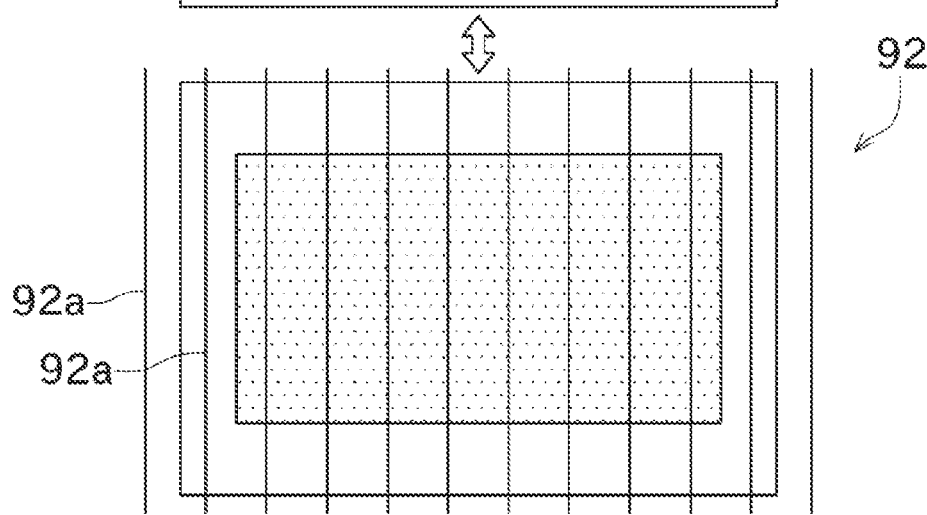

TRAVEL ROUTING AND CONTROL FOR AUTONOMOUS FIELD TRAVEL SYSTEM

CROSS REFERENCES TO RELATED APPLICATIONS

This application is a national stage application pursuant to 35 U.S.C. § 371 of International Application No. PCT/JP2019/049786, filed on Dec. 19, 2019 which claims priority under 35 U.S.C. § 119 to Japanese Patent Application No. 2019-012666 filed on Jan. 29, 2019, the disclosures of which are hereby incorporated by reference in their entireties.

TECHNICAL FIELD

The present invention mainly relates to an autonomous travel system for autonomously traveling a work vehicle along a travel route.

BACKGROUND ART

In order to make a work vehicle autonomously travel by using an autonomous travel system, it is necessary to create a travel route in advance. Patent Literature 1 discloses a method of designating two points in a field by an operator to create a straight route extending a reference line passing through these two points, and disposing the straight routes side by side to create a travel route (a travel route excluding turning). Patent Literature 2 discloses a method of creating a travel route (travel route including turning) including straight routes disposed in a work area of a field and a turning route connecting the straight routes.

CITATION LIST

Patent Literature

Patent Literature 1: Japanese Patent No. 4948098
Patent Literature 2: Japanese Unexamined Patent Application Publication No. 2017-211734

DISCLOSURE OF INVENTION

Problems to be Solved by the Invention

Herein, depending on various circumstances such as the shape of the field and the request of the operator, both the travel route excluding the turning and the travel route including the turning may be created in the same field. Further, when the positions of these travel routes (specifically, the positions of the straight routes) do not coincide with each other, it is necessary to adjust the positions of the travel routes. In addition, since these travel routes are created in the same field, it is desirable to manage the travel routes efficiently.

The present invention has been made in view of the aforementioned circumstances, and a main object of the present invention is to provide a configuration in which even when a plurality of travel routes are set in the same fields, it is not necessary to adjust the positions of the plurality of travel routes, and it is possible to efficiently manage the plurality of travel routes.

Means for Solving the Problems

Effect of the Invention

The problem to be solved by the present invention is as described above, and the means for solving the problem and the effect thereof will be described in the following.

According to the viewpoint of the present invention, an autonomous travel system having the following configuration is provided. That is, this autonomous travel system includes a first travel route creation unit, a second travel route creation unit, an interlocking route creation unit, a storage unit, a route selection unit, and a travel control unit. The first travel route creation unit is capable of creating a first travel route that is a travel route for allowing a work vehicle to travel in a field, and includes a plurality of first straight routes disposed at an interval so as to be within the field, and a turning route for connecting the first straight routes. The second travel route creation unit is capable of creating a second travel route that is a travel route for allowing the work vehicle to travel in the field, and includes a plurality of second straight routes disposed at an interval. The interlocking route creation unit has at least one of a function of creating the second travel route by creating the second straight routes each having at least a part overlapped with the first straight route in conjunction with creation of the first travel route by the first travel route creation unit, and a function of creating the first travel route including the first straight routes overlapped with the second straight routes in conjunction with creation of the second travel route by the second travel route creation unit. The storage unit stores the travel route created by the first travel route creation unit or the second travel route creation unit, and the travel route created by the interlocking route creation unit in association with each other. The route selection unit selectively selects the first travel route or the second travel route in accordance with an input instruction. The travel control unit causes the work vehicle to autonomously travel along at least a part of the first travel route or the second travel route selected by the route selection unit.

Consequently, the respective positions of the straight routes coincide with each other on the two travel routes, and therefore it is not necessary to adjust the positions of the travel routes. In addition, the two travel routes created in conjunction with each other are associated with each other, so that it becomes easy to manage these travel routes and apply the travel routes to the work vehicle. Further, when one travel route is created, the other travel route is automatically created, and therefore it is possible to reduce the trouble in creation of the travel route.

In the autonomous travel system, a process of creating the second travel route by the interlocking route creation unit in conjunction with creation of the first travel route by the first travel route creation unit preferably includes a process of extending the first straight routes of the first travel route to form the second straight routes.

Consequently, the second travel route can be created from the first travel route by a simple process. In particular, when there is information necessary for creating the first travel route, the second travel route can be created, so that the second travel route can be automatically created without asking the user for additional input or the like.

In the autonomous travel system, the following configuration is preferable. That is, this autonomous travel system includes a display unit and a display control unit. The display unit displays the travel route selected by the route selection unit and a travel history of the work vehicle. The display control unit merges the travel history before switching and the travel history after switching, and displays the merged travel histories on the display unit, when the travel route selected by the route selection unit is switched.

Consequently, even when the travel route is switched, the travel history of the entire field can be easily grasped.

BRIEF DESCRIPTION OF DRAWINGS

FIG. 6 is a diagram illustrating a process of creating, from one of the first travel route and the second travel route, the other travel route.

DESCRIPTION OF EMBODIMENTS

Figure 1:
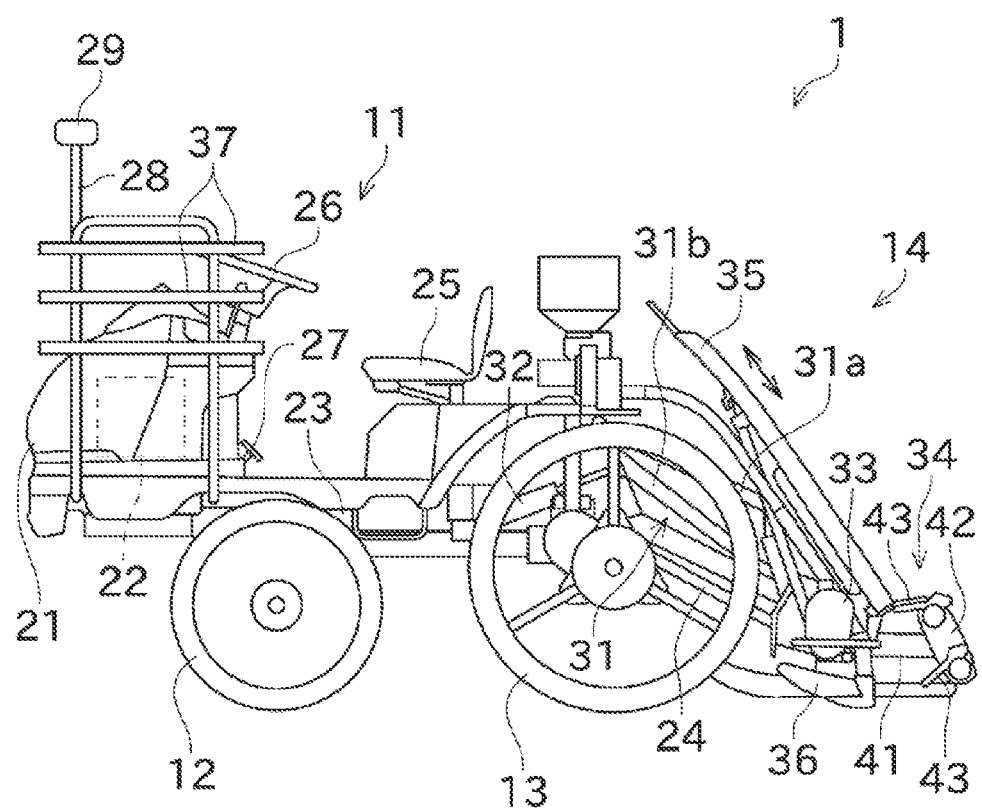
FIG. 1 is a side view of a transplanter provided in an autonomous travel system according to an embodiment of the present invention.
Figure 2:
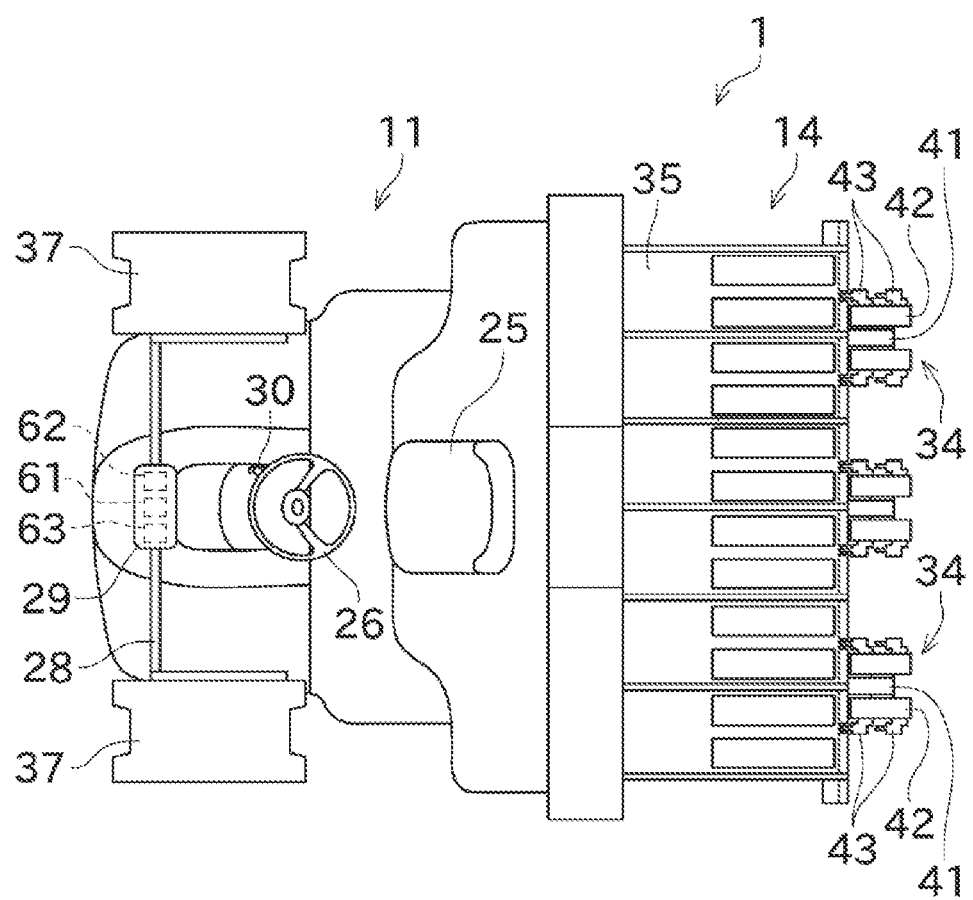
FIG. 2 is a plan view of the transplanter.
Figure 3:
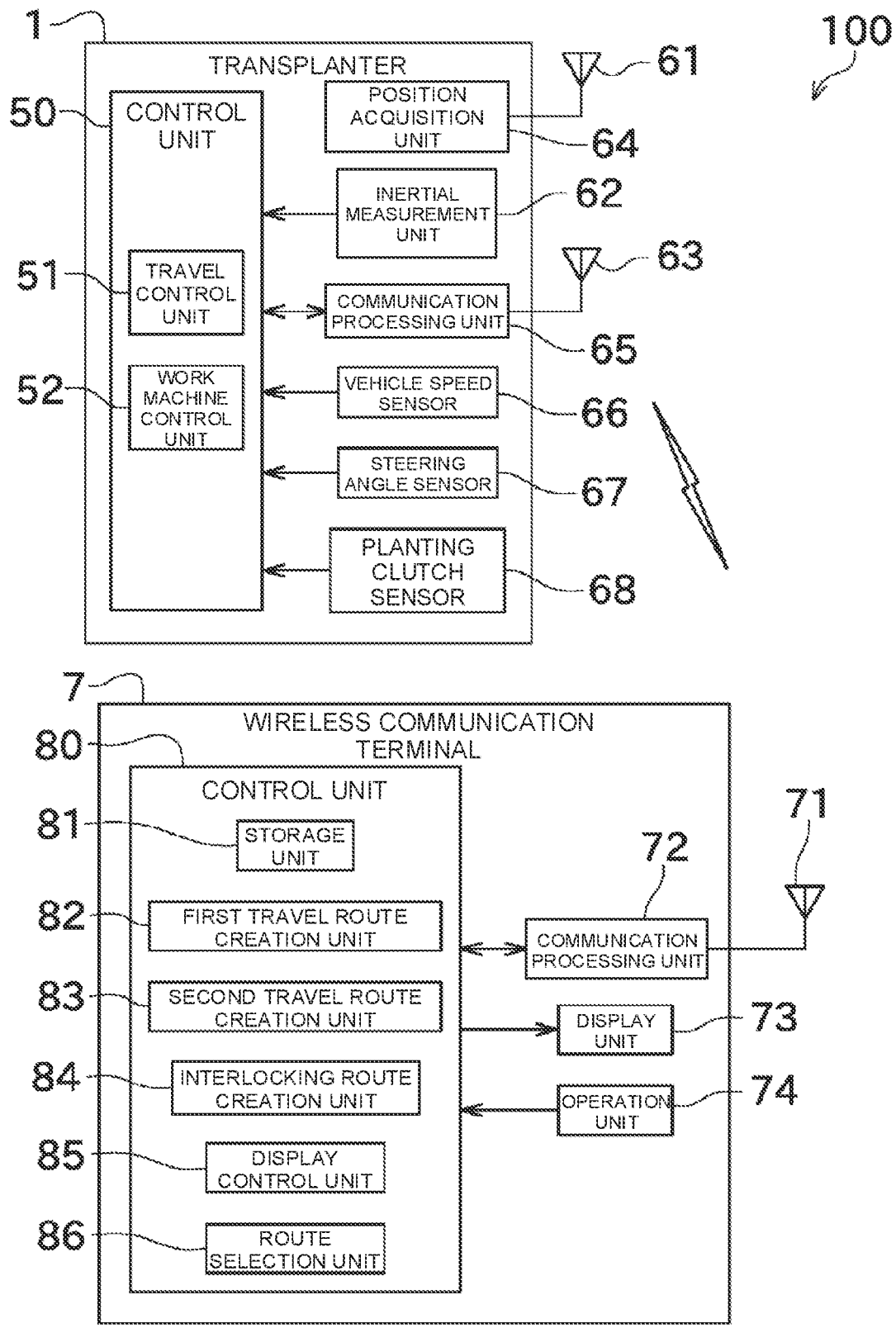
FIG. 3 is a block diagram of the transplanter and a wireless communication terminal.

Now, an embodiment of the present invention will be described with reference to the drawings. FIG. 1 is a side view of a transplanter 1 used in an autonomous travel system 100 according to the embodiment of the present invention. FIG. 2 is a plan view of the transplanter 1. FIG. 3 is a block diagram of the transplanter 1 and a wireless communication terminal 7.

In the autonomous travel system 100 of this embodiment, the transplanter 1 is used as a work vehicle for performing work in a field, and an operator gives an instruction by using the wireless communication terminal 7 or the like, so that the transplanter 1 performs work (planting work of seedlings) while causing the transplanter 1 to autonomously travel. The work vehicle in the present invention is not limited to the transplanter 1, and for example, a seeder, a tractor, a combine, or the like can be used.

The autonomous travel means that a device related to travel is controlled by a control unit included in the transplanter 1, so that at least steering is autonomously performed along a predetermined route. Further, in addition to the steering, a vehicle speed or work by a work machine may be autonomously performed. The autonomous travel includes a case where a person is on the transplanter 1 and a case where no person is on the transplanter 1.

As illustrated in FIGS. 1 and 2, the transplanter 1 includes a vehicle body section 11, front wheels 12, rear wheels 13, and a planting section 14. The front wheels 12 and the rear wheels 13 are each provided left and right in pairs with respect to the vehicle body section 11.

The vehicle body section 11 includes a bonnet 21. The bonnet 21 is provided at a front portion of the vehicle body section 11. An engine 22 is provided inside the bonnet 21. Power generated by the engine 22 is transmitted to the front wheels 12 and the rear wheels 13 via a mission case 23. This power is also transmitted to the planting section 14 via the mission case 23 and a PTO shaft 24 disposed at a rear portion of the vehicle body section 11.

The vehicle body section 11 further includes a driver seat 25 and a plurality of operating members. An operator can sit on the driver seat 25. The driver seat 25 is disposed between the front wheels 12 and the rear wheels 13 in the front-rear direction of the vehicle body section 11. The plurality of operating members have a steering handle 26, a speed change operation pedal 27, and a planting clutch lever 30.

The transplanter 1 can be steered by operation of the steering handle 26. By operating the speed change operation pedal 27, the traveling speed (vehicle speed) of the transplanter 1 can be adjusted. By operation of the planting clutch lever 30, switching can be performed between a transmission state in which a planting clutch transmits power to the PTO shaft 24 (that is, the planting section 14), and a cut-off state in which the planting clutch does not transmit power to the PTO shaft 24 (that is, the planting section 14).

The planting section 14 is disposed behind the vehicle body section 11. The planting section 14 is connected to the vehicle body section 11 via a lifting link mechanism 31. The lifting link mechanism 31 is composed of a parallel link including a top link 31a and a lower link 31b.

In the lifting link mechanism 31, a lifting cylinder 32 of a lifting device is connected to the lower link 31b. The lifting device can lift and lower the planting section 14 with respect to the vehicle body section 11 by expanding and contracting the lifting cylinder 32. The lifting cylinder 32 is a hydraulic cylinder in this embodiment, but may be an electric cylinder. Further, the lifting device may lift and lower the planting section 14 by an actuator other than the cylinder.

The planting section 14 includes a planting input case portion 33, a plurality of planting units 34, a seedling stand 35, a plurality of floats 36, and spare seeding stands 37. The planting section 14 can sequentially supply a seeding to each planting unit 34 from the seedling stand 35, and can continuously plant the seedlings.

Each planting unit 34 has a planting transmission case portion 41 and rotary case portions 42. Power is transmitted to each planting transmission case portion 41 via the PTO shaft 24 and the planting input case portion 33.

The rotary case portions 42 are rotatably attached to each planting transmission case portion 41. The rotary case portions 42 are disposed on both sides in the vehicle width direction of the planting transmission case portion 41. Two planting claws 43 are attached to one side of each rotary case portion 42.

The two planting claws 43 are disposed in the traveling direction of the transplanter 1. The two planting claws 43 are displaced with rotation of each rotary case portion 42. The two planting claws 43 are displaced, so that one row of seedlings is planted.

The seeding stand 35 is disposed in front of and above the plurality of planting units 34. The seeding mat can be placed on the seeding stand 35. The seeding stand 35 is configured such that the seedlings of the seedling mats placed on the seeding stand 35 can be supplied to each planting unit 34.

Specifically, the seeding stand 35 is configured to be laterally feedable (slidable in the lateral direction) so as to reciprocate in the vehicle width direction. Further, the seedling stand 35 is configured such that the seedling mat can be intermittently vertically fed downward at a reciprocating end of the seedling stand 35.

The float 36 is provided at a lower portion of the planting section 14 so as to be swingable. The float 36 can bring a lower surface of the float 36 into contact with a field surface in order to stabilize the planting posture of the planting section 14 with respect to the field surface.

The spare seedling stands 37 are provided left and right in pairs with respect to the vehicle body section 11. The spare seedling stands 37 are disposed in the vehicle width direction outside the bonnet 21. The spare seedling stands 37 can be equipped with a seedling box containing spare mat seedlings.

The upper portions of the pair of left and right spare seedling stands 37 are connected by a connecting frame 28 extending in the vertical direction and the vehicle width direction. A housing 29 is provided at the center of the connecting frame 28 in the vehicle width direction. A positioning antenna 61, an inertial measurement unit 62, and a communication antenna 63 are provided inside the housing 29.

The positioning antenna 61 can receive radio waves from a positioning satellite constituting a satellite positioning system (GNSS). A known positioning calculation is performed on the basis of the radio waves, so that the position of the transplanter 1 can be acquired.

The inertial measurement unit 62 has three gyro sensors (angular velocity sensors) and three acceleration sensors. The angular velocity and the acceleration of the transplanter 1 detected by the inertial measurement unit 62 are auxiliary used, so that the accuracy of the positioning result of the transplanter 1 is improved.

The communication antenna 63 is an antenna for performing wireless communication with the wireless communication terminal 7 illustrated in FIG. 3.

As illustrated in FIG. 3, a control unit 50 includes an arithmetic unit, a storage device, an input/output unit, and the like (not illustrated). Various programs, data, and the like are stored in the storage device. The arithmetic unit can read various programs from the storage device, and execute the programs. By the cooperation of the above hardware and software, the control unit 50 can be operated as a travel control unit 51 and a work machine control unit 52. The control unit 50 may be one piece of hardware or a plurality of pieces of hardware that can communicate with each other. Further, in addition to the inertial measurement unit 62 described above, a position acquisition unit 64, a communication processing unit 65, a vehicle speed sensor 66, a steering angle sensor 67, and a planting clutch sensor 68 are connected to the control unit 50.

The position acquisition unit 64 is electrically connected to the positioning antenna 61. The position acquisition unit 64 acquires a position of the transplanter 1 as, for example, latitude and longitude information from a positioning signal received by the positioning antenna 61. The position acquisition unit 64 receives a positioning signal from a reference station (not illustrated) by an appropriate method, and then performs positioning by using a known GNSS-RTK method. However, instead of the GNSS-RTK method, for example, positioning using a differential GNSS, independent positioning, or the like may be performed. Alternatively, position acquisition based on the radio wave intensity of a wireless LAN or the like, or position acquisition by inertial navigation may be performed.

The communication processing unit 65 is electrically connected to the communication antenna 63. This communication processing unit 65 can perform a modulation process or a demodulation process by an appropriate method to transmit/receive data to/from the wireless communication terminal 7.

The vehicle speed sensor 66 can detect the vehicle speed of the transplanter 1. The vehicle speed sensor 66 is provided at an appropriate position of the transplanter 1, for example, on an axle of the front wheels 12. In this case, the vehicle speed sensor 66 generates a pulse according to the rotation of the axle of the front wheels 12. Data of a detection result obtained by the vehicle speed sensor 66 is output to the control unit 50.

The steering angle sensor 67 can detect the steering angle of the front wheels 12. The steering angle sensor 67 is provided at an appropriate position of the transplanter 1, for example, at a kingpin (not illustrated) provided on each front wheel 12. The steering angle sensor 67 may be provided on the steering handle 26. Data of a detection result obtained by the steering angle sensor 67 is output to the control unit 50.

The planting clutch sensor 68 is a sensor that detects an operating position of the planting clutch lever 30. A detection result of the planting clutch sensor 68 is output to the control unit 50. The control unit 50 can specify whether or not the planting work is being performed, on the basis of the detection result from the planting clutch sensor 68. Data of the detection result obtained by the planting clutch sensor 68 is output to the control unit 50.

The travel control unit 51 can perform automatic control regarding the travel of the transplanter 1. For example, the travel control unit 51 can perform vehicle speed control and steering control. The travel control unit 51 may perform both the vehicle speed control and the steering control at the same time, or may perform only the steering control. In the latter case, the vehicle speed of the transplanter 1 is operated by an operator by using the speed change operation pedal 27.

In the vehicle speed control, the vehicle speed of the transplanter 1 is adjusted on the basis of a predetermined condition. Specifically, in the vehicle speed control, the travel control unit 51 performs control for approximating a current vehicle speed obtained from the detection result of the vehicle speed sensor 66 to a target vehicle speed. This control is realized by changing at least one of the gear ratio of a transmission device in the mission case 23 and the rotation speed of the engine 22. The vehicle speed control also includes control for setting the vehicle speed to zero so as to stop the transplanter 1.

Steering control is control for adjusting the steering angle of the transplanter 1 on the basis of a predetermined condition. Specifically, in the steering control, the travel control unit 51 performs control for approximating a current steering angle obtained from the detection result of the steering angle sensor 67 to a target steering angle. This control is realized, for example, by driving a steering actuator provided in a rotation shaft of the steering handle 26. Regarding the steering control, the travel control unit 51 may directly adjust the steering angle of the front wheels 12 of the transplanter 1 instead of the rotation angle of the steering handle 26.

The work machine control unit 52 can control the operation (lifting operation, planting work, and the like.) of the planting section 14 on the basis of a predetermined condition.

The wireless communication terminal 7 is a tablet terminal, and includes a communication antenna 71, a communication processing unit 72, a display unit 73, an operation unit 74, and a control unit 80. The wireless communication terminal 7 is not limited to the tablet terminal, and may be a smartphone or a notebook computer. The wireless communication terminal 7 performs various processes related to the autonomous travel of the transplanter 1 as described later, but at least one of these processes can be performed by the control unit 50 of the transplanter 1. On the contrary, the wireless communication terminal 7 can also perform at least one of various processes related to the autonomous travel performed by the control unit 50 of the transplanter 1.

The communication antenna 71 includes a short-range communication antenna for wireless communication with the transplanter 1, and a mobile communication antenna for communication using a mobile phone line and the Internet. The communication processing unit 72 is electrically connected to the communication antenna 71. The communication processing unit 72 can perform a modulation process or a demodulation process by an appropriate method to transmit/receive data to/from the wireless communication terminal 7 or another device. Therefore, for example, a part of the information stored in the control unit 50 or the control unit 80 can be stored in an external server.

The display unit 73 is a liquid crystal display, an organic EL display, or the like, and is configured to be able to display an image. The display unit 73 can display, for example, information related to autonomous travel, information related to the setting of the transplanter 1, detection results of the various sensors, warning information, and the like. The operation unit 74 includes a touch panel and a hardware key. The touch panel is disposed so as to overlap with the display unit 73, and can detect operation by an operator's finger or the like. The hardware key is disposed on a side surface of a housing of the wireless communication terminal 7, around the display unit 73, or the like, and can be operated by pressing by the operator. The wireless communication terminal 7 may be configured to include only one of the touch panel and the hardware key.

The control unit 80 includes an arithmetic unit, a storage device, an input/output unit, and the like (not illustrated). Various programs, data, and the like are stored in the storage device. The arithmetic unit can read various programs from the storage device, and execute the programs. By the cooperation of the above hardware and software, the control unit 80 can be operated as a storage unit 81, a first travel route creation unit 82, a second travel route creation unit 83, an interlocking route creation unit 84, a display control unit 85, and a route selection unit 86. Processes performed by each unit of the control unit 80 will be described later.

Figure 4:
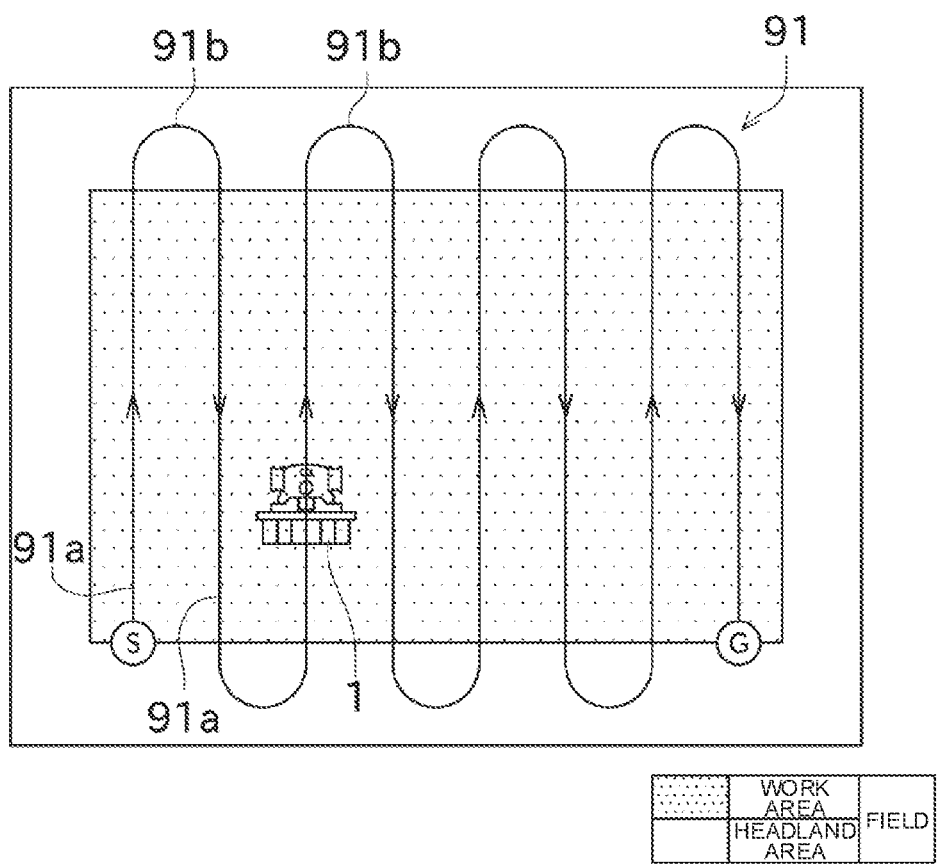
FIG. 4 is a diagram illustrating a first travel route.
Figure 5:
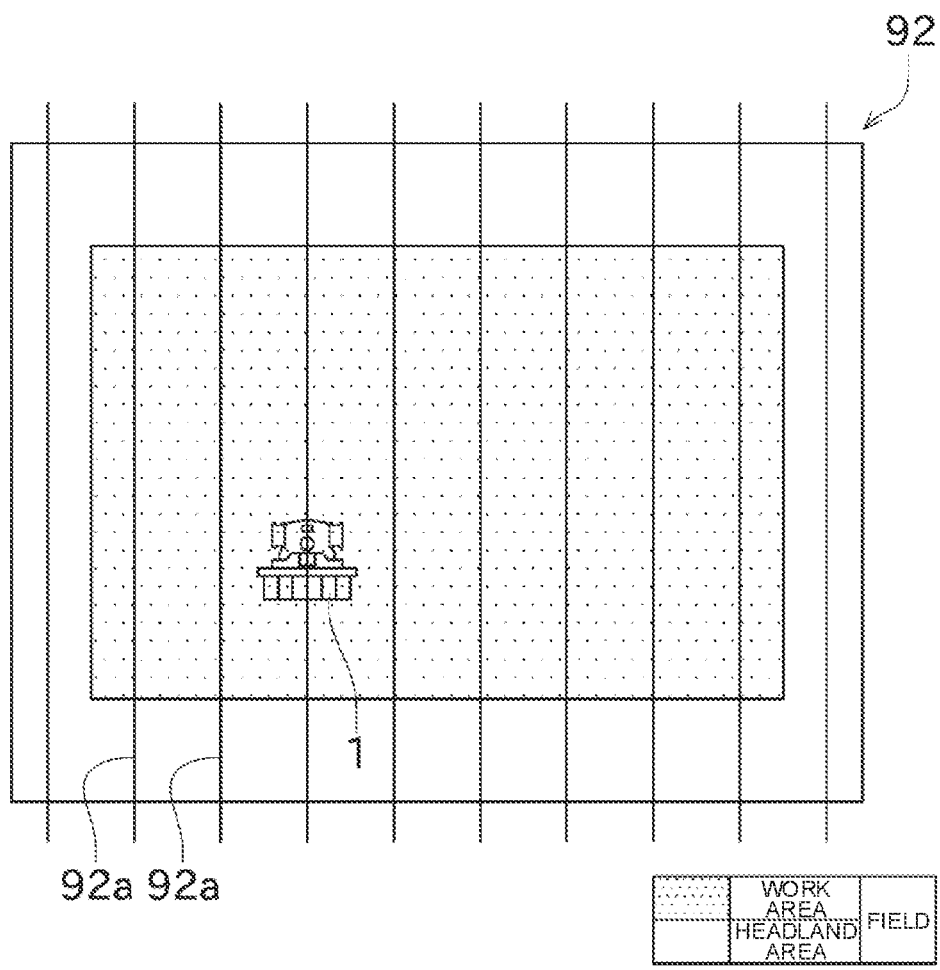
FIG. 5 is a diagram illustrating a second travel route.

Now, the field and the travel route for autonomous travel will be described with reference to FIGS. 4 and 5. The field includes a work area and a headland area. The work area is located in a central part of the field and is an area for performing work. The headland area is located outside the work area and is an area used for properly performing work in the work area. For example, the headland area is used to move, to a start position of work in the work area, the transplanter 1 that enters the field. Further, the headland area is also used as an area for turning the transplanter 1.

The position and the shape of the field are created on the basis of transition of position information when the transplanter 1 travels along an outer circumference of the field. The position and shape of the field may be created without causing the transplanter 1 to actually travel, for example, by designation of a range on a map displayed on the display unit 73 by a user. Further, in this embodiment, the information related to the field is stored in the wireless communication terminal 7, but may be stored in the server described above. In this case, the wireless communication terminal 7 acquires information related to the field from this server.

In this embodiment, a first travel route 91 and a second travel route 92 are created as travel routes for causing the transplanter 1 to autonomously travel. Hereinafter, the first travel route 91 and the second travel route 92 may be collectively referred to as a "travel route". First, the first travel route 91 will be described. The first travel route 91 is created by the first travel route creation unit 82 or the interlocking route creation unit 84. As illustrated in FIG. 4, the first travel route 91 includes a plurality of first straight routes 91a and a plurality of turning routes 91b. Further, a start position (S in FIG. 4) and an end position (G in FIG. 4) are set in the first travel route 91.

Each first straight route 91a is a straight route, and is parallel to, for example, one side (for example, a short side) of a contour of the field or the work area. The first straight routes 91a are created so as to be within the field. In this embodiment, the first straight routes 91a may be created so as to be within the work area, or may be created so as to slightly protrude from the work area. Each first straight route 91a is a route for allowing the transplanter 1 to move straight in the work area, and therefore at least a part thereof is created so as to overlap the work area. Each of arrangement intervals between the first straight routes 91a is determined on the basis of, for example, a work width, an overlap length (length indicating how much the adjacent work ranges overlap in the vehicle width direction), and a work interval (length indicating how much the adjacent work ranges are spaced in the vehicle width direction), and the like.

Each of the turning routes 91b is a route connecting the first straight routes 91a. In this embodiment, each turning route 91b connects the first straight routes 91a adjacent to each other, but may connect the first straight routes 91a further apart from each other. Further, each turning route 91b of this embodiment is a route that causes the transplanter 1 to turn by 180 degrees to invert the transplanter 1 and reach the next first straight route 91a. Instead of the above, each turning route 91b may be a route that causes the transplanter 1 to turn by 90 degrees and then move rearward, and thereafter moves forward and turn by 90 degrees, to reverse the transplanter 1 and reach the next first straight routes 91a (a route for performing a so-called fishtail turn). Thus, the first travel route creation unit 82 creates the first travel route 91 on the basis of the start position, the end position, the position of the field, the position of the work area, the arrangement intervals of the first straight routes 91a, and the turning method. At least one of these conditions may be omitted, or other conditions may be added.

Now, the second travel route 92 will be described. The second travel route 92 is created by the second travel route creation unit 83 or the interlocking route creation unit 84. As illustrated in FIG. 5, the second travel route 92 is composed of a plurality of second straight routes 92a. The second travel route 92 is a route for the purpose of autonomously traveling only on the straight portion. Turning is performed manually (by operating the steering handle 26) at the timing intended by an operator. Further, the start position and the end position are not set in the second travel route 92. Hereinafter, the first straight routes 91a and the second straight routes 92a may be collectively referred to as "straight routes".

Each of the second straight routes 92a is a straight route, and is parallel to, for example, one side (for example, a short side) of the contour of the field or the work area like each first straight route 91a. Each second straight routes 92a of this embodiment is created so as to protrude from the field, but may be created only in the field. Intervals of the second straight routes 92a are determined by the same criteria as that of the first straight routes 91a. The number of lines created by the second straight routes 92a is not particularly limited. Each second straight route 92a of this embodiment is created at a position that does not overlap the field at all, but may be created only at a position that overlaps the field. The second travel route creation unit 83 creates the second travel route 92 by, for example, connecting two positions designated by an operator to form a line segment, extending the line segment, and disposing the line segments at the aforementioned arrangement intervals.

The interlocking route creation unit 84 has a first interlocking function of creating the second travel route 92 in conjunction with the creation of the first travel route 91 by the first travel route creation unit 82. Further, the interlocking route creation unit 84 has a second interlocking function of creating the first travel route 91 in conjunction with the creation of the second travel route 92 by the second travel route creation unit 83. The first interlocking function and the second interlocking function are configured so as to be able to individually set validity/invalidity.

First, the first interlocking function will be described. When the first interlocking function is valid, the interlocking route creation unit 84 extracts the single first straight route 91*a* from the first travel route 91 as illustrated in FIG. 6 (the central diagram of FIG. 5). In this embodiment, the single first straight route 91*a* including the start position is extracted, but other first straight route 91*a* may be extracted. Next, the interlocking route creation unit 84 extends the extracted first straight route 91*a* to create the second straight route 92*a*.

Finally, the interlocking route creation unit 84 further creates the second straight routes 92*a* at the same arrangement intervals as the first straight routes 91*a*. Thus, the interlocking route creation unit 84 creates the second travel route 92. By the creation of the second travel route 92 by this method, the first straight routes 91*a* and the second straight routes 92*a* overlap each other (the positions of the straight routes coincide with each other).

The length of each second straight route 92*a* may be a fixed value or may be a value determined in accordance with the size of the corresponding field. Further, the number of the second straight routes 92*a* to be disposed may be a fixed value or may be a value determined in accordance with the size of the corresponding field.

Next, the second interlocking function will be described. When the second interlocking function is valid, the interlocking route creation unit 84 extracts the second straight route that overlaps the work area and is disposed at the end, from the second straight routes 92*a* of the second travel route 92, as illustrated in FIG. 5. Then, the interlocking route creation unit 84 creates (shortens) the length of the second straight route 92*a* on the basis of the size of the work area, so that the first straight route 91*a* are cleated (the central diagram of FIG. 5)). When the field, the work area, and the like are not registered, the second travel route 92 cannot be created. Therefore, the interlocking route creation unit 84 displays the above fact on the display unit 73.

Next, the interlocking route creation unit 84 disposes the first straight routes 91*a* side by side at the same arrangement intervals as the second straight routes 92*a* in such a range as to overlap the work area. Finally, the interlocking route creation unit 84 creates the turning routes 91*b* on the basis of the start position, the ending position, the turning method, and the like. When these conditions are set in advance, the interlocking route creation unit 84 uses the settings. When necessary conditions are missing, the interlocking route creation unit 84 displays a screen for causing an operator to input the necessary conditions.

The method of creating a travel route by the first interlocking function and the second interlocking function is an example, and the travel route may be created by a method different from the above.

Figure 7:
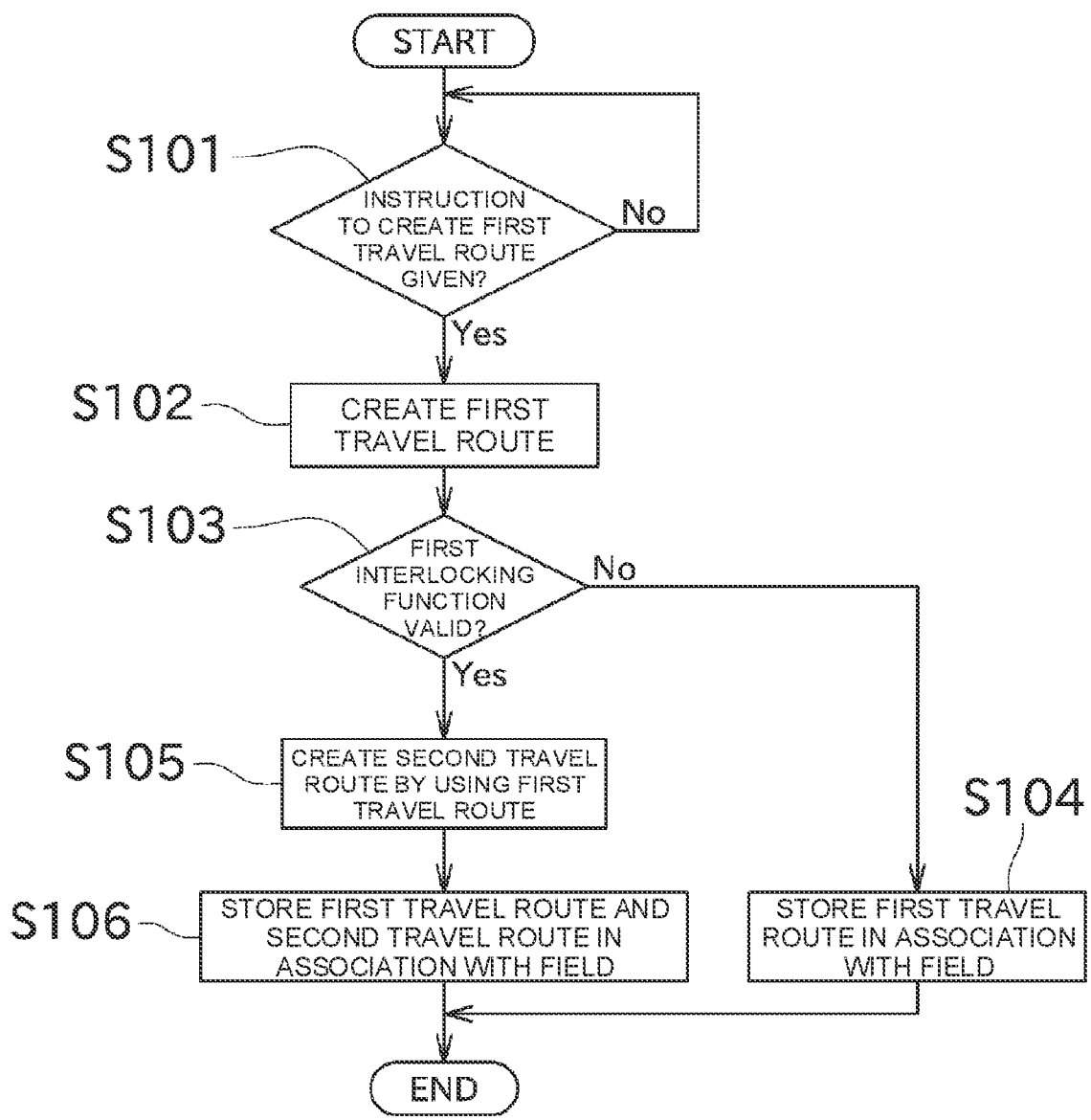
FIG. 7 is a flowchart illustrating a process performed when the first travel route is created.
Figure 8:
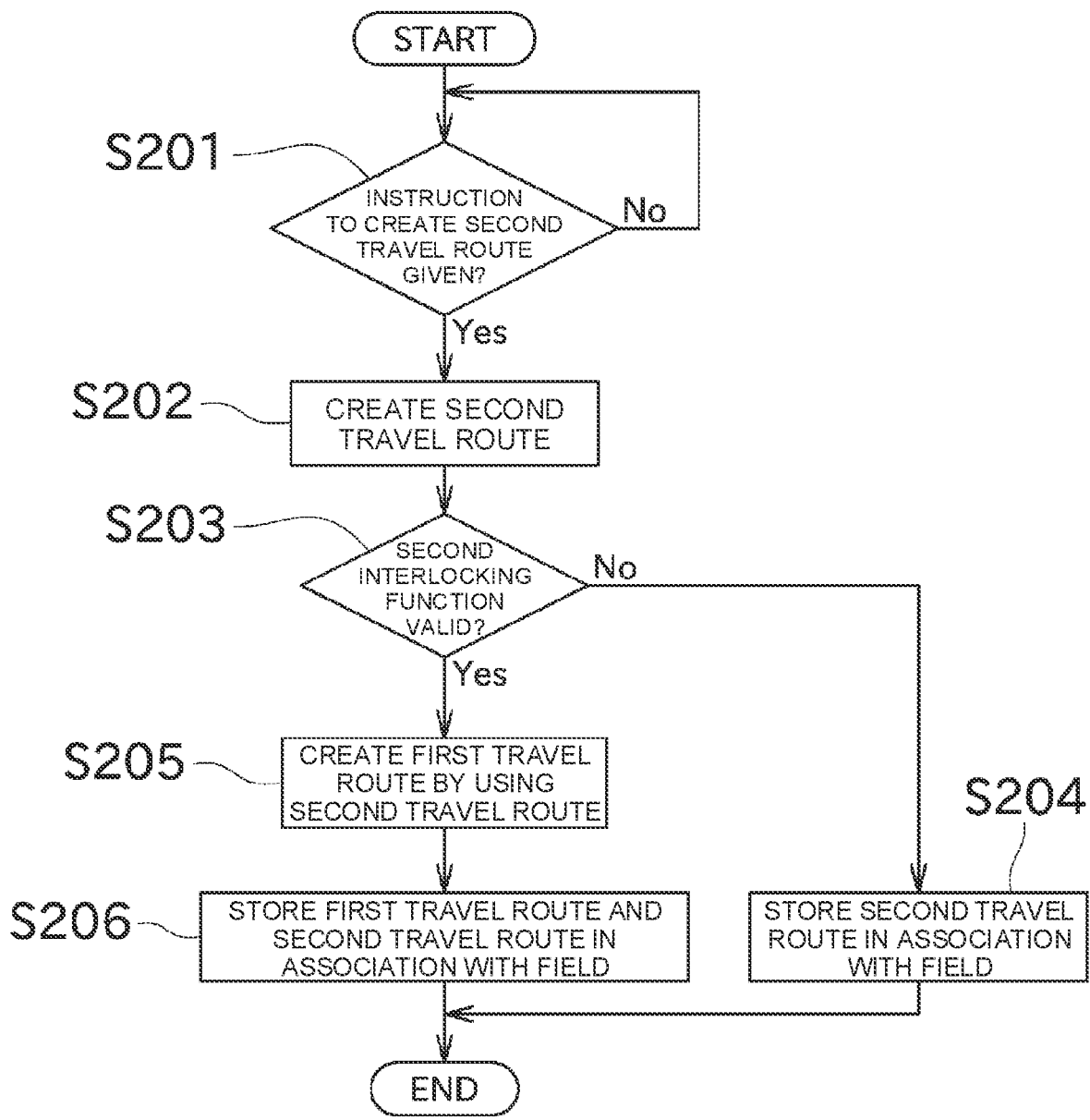
FIG. 8 is a flowchart illustrating a process performed when the second travel route is created.

Now, the flow of creation of the travel route by the first travel route creation unit 82, the second travel route creation unit 83 and the interlocking route creation unit 84 will be briefly described with reference to FIGS. 7 and 8. FIG. 7 is a flowchart illustrating a process performed when the first travel route 91 is created. FIG. 8 is a flowchart illustrating a process performed when the second travel route 92 is created.

The first travel route creation unit 82 creates the first travel route 91 by the method described above (S102) when the operator gives an instruction to create the first travel route (S101). Next, the interlocking route creation unit 84 determines whether the first interlocking function is valid or invalid (S103). When the first interlocking function is invalid, the storage unit 81 stores the first travel route 91 created by the first travel route creation unit 82 in association with the field (S104). The "memory associated with a field" means that, for example, the field identification information and the travel route identification information are stored in association with each other. When the first interlocking function is valid, the interlocking route creation unit 84 creates the second travel route 92 by using the first travel route 91 as described above (S105). Next, both the first travel route 91 and the second travel route 92 are associated with the field and stored in the storage unit 81 (S106).

In this embodiment, the validity/invalidity of the first interlocking function is set in advance. Instead of or in addition to the above, a configuration in which the validity/invalidity of the first interlocking function can be selected at the time of creation of the first travel route may be used. For example, on a creation screen for the first travel route, a check box to validate that the second travel route is created at the same time may be provided. When the operator checks this check box, the first interlocking function is validated. Further, the fact that the second travel route 92 is created in conjunction with the first travel route 91 may be displayed or may not be displayed on the display unit 73.

Contrary to FIG. 7, FIG. 8 illustrates a process when an instruction to create the second travel route 92 is given. The processes of S201 to S206 in FIG. 8 correspond to the processes of S101 to S106 in FIG. 7, and the first and the second are simply exchanged, and therefore the description thereof will be omitted. Further, a modification related to the first interlocking function is also applicable to the second interlocking function.

Figure 9:
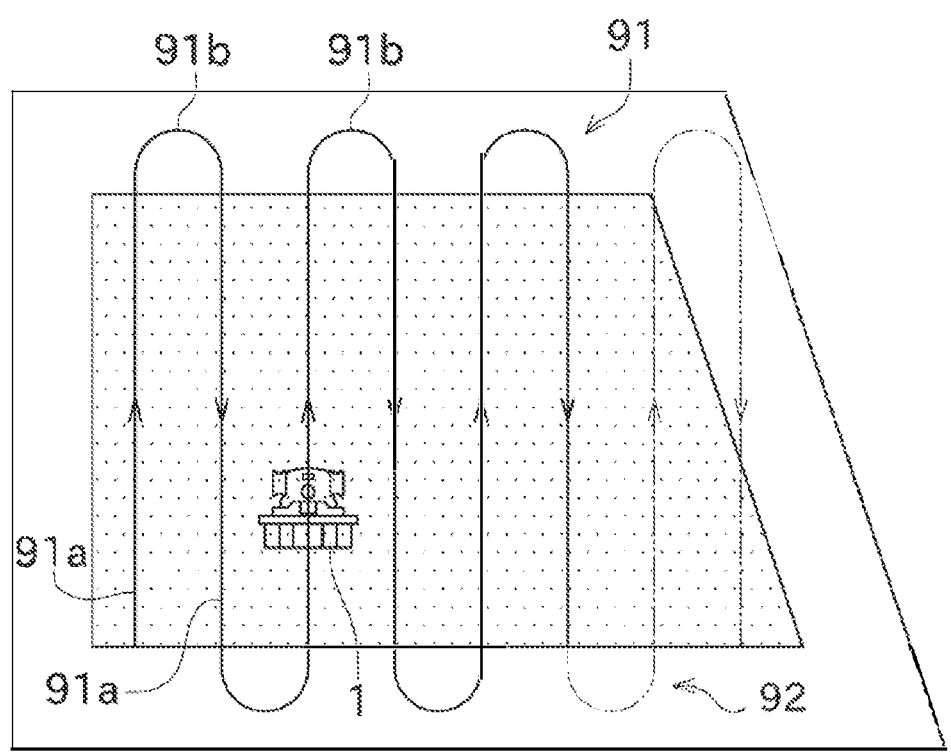
FIG. 9 is a diagram illustrating a shape of a field where it is assumed that work is performed by switching between the first travel route and the second travel route.
Figure 10:
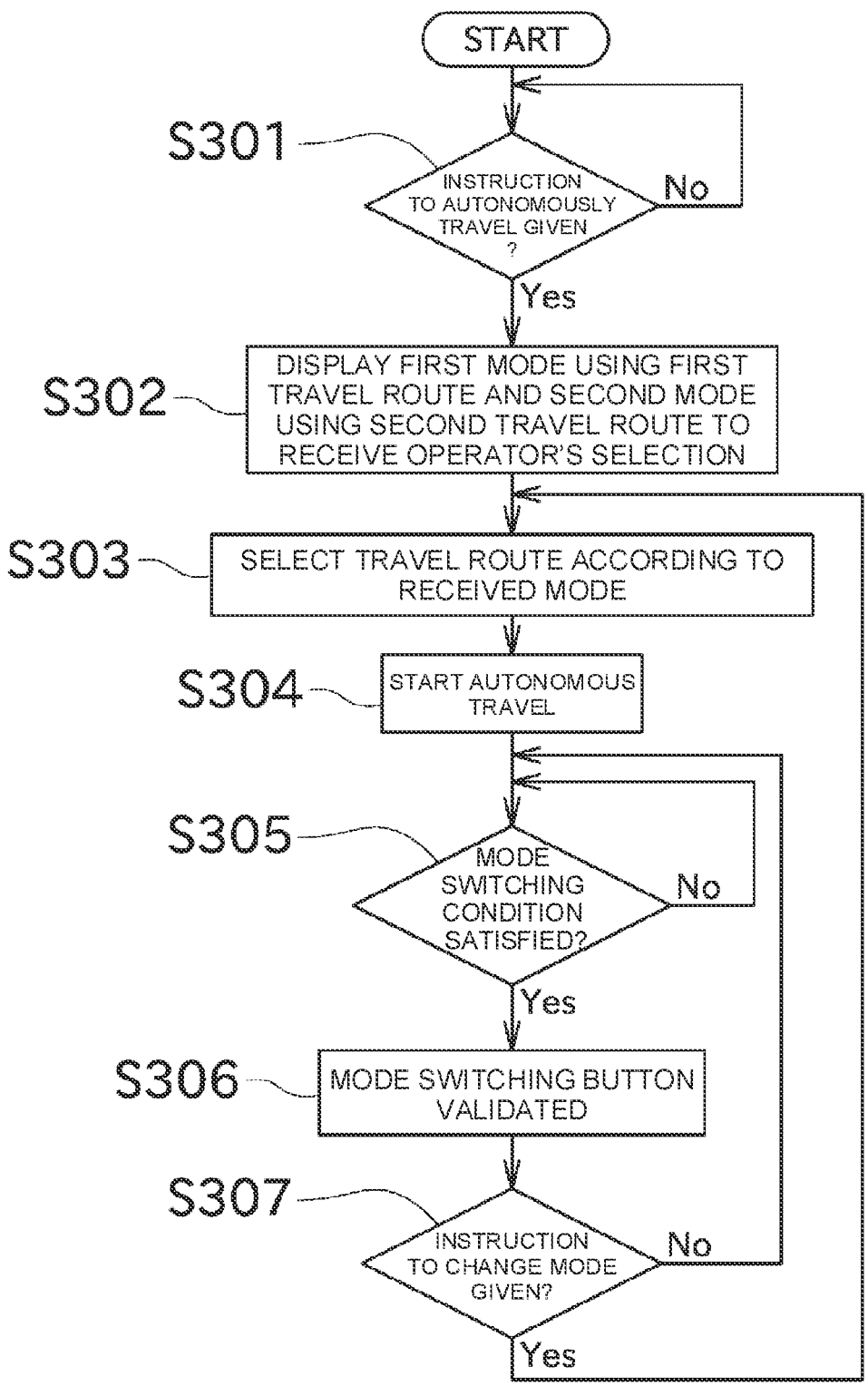
FIG. 10 is a flowchart illustrating a process related to autonomous travel.

Now, switching of the travel route will be described with reference to FIGS. 9 to 11. First, with reference to FIG. 9, an example of a situation in which it is necessary to switch the travel route will be described. FIG. 9 is a diagram illustrating a shape of a field where it is assumed that work is performed by switching between the first travel route 91 and the second travel route 92.

The field illustrated in FIG. 9 is trapezoidal, and the work area is trapezoidal accordingly. In the example illustrated in FIG. 9, a contour on the right side of the work area is inclined with respect to a contour on the left side of the work area. In addition, first straight routes 91*a* parallel to the left side of the work area is created. Therefore, in the vicinity of a right end of the work area, the first straight routes 91*a* and the contour (oblique side) on the right side of the work area intersect. As a result, an angle formed by the route and the work area is greatly far from 90 degrees. In addition, the first travel route 91 approaches an edge of the field. Therefore, a portion illustrated by an alternate long and short dash line in FIG. 9 may not be able to be set as a route for autonomous travel. Therefore, travel on the portion indicated by the alternate long and short dash line is performed using the second travel route 92.

Even when the shape of each of the field and the work area is other than the trapezoid, it may be necessary to switch between the first travel route 91 and the second travel route 92. Herein, in the first travel route 91, the turning routes 91b are each created at a position having a margin for reliably turning the transplanter 1 (for example, at a position sufficiently distant from the edge of the field, an obstacle, or the like). Therefore, for example, when the first travel route 91 is created, for example, in a situation in which there is an obstacle in the field, there is a possibility that a range in which the work can be performed is narrowed. Therefore, it may be preferable for the operator to manually turn the transplanter 1 only on a portion that bypasses or avoids the obstacle by using the second travel route 92.

Further, conventionally, even when the first travel route 91 and the second travel route 92 are created, the two travel routes are managed separately. Therefore, in order to switch the travel route, it is necessary for the operator to search for and select the second travel route 92 by displaying a screen such as a list of routes after the autonomous travel using the first travel route 91 is completed. Further, the first travel route 91 and the second travel route 92 are created individually, and therefore the positions of the first straight routes 91a and the second straight routes 92a usually do not coincide with each other. In order to prevent overlapping work and work omission, the positions of the first straight routes 91a and the second straight routes 92a need to coincide with each other. Therefore, it is necessary to adjust the route.

Now, a flow of a process for switching the travel route and performing the work by the autonomous travel system 100 of this embodiment will be described with reference to FIGS. 10 and 11. FIG. 10 is a flowchart illustrating a process related to autonomous travel. FIG. 11 is a diagram illustrating a screen displayed on the wireless communication terminal 7 before and after mode switching. Further, in the following, performing the work by using the first travel route 91 is referred to as a first mode, and performing the work by using the second travel route 92 is referred to as a second mode.

First, the operator operates the operation unit 74 to give an instruction to start autonomous travel. When the control unit 80 receives an instruction for autonomous travel by the operator (S301), the control unit 80 displays, on the display unit 73, a screen for allowing the operator to select whether to perform the work in the first mode or the second mode (S302). The operator is made to select buttons described as the first mode, the second mode, and the like in this embodiment, but the operator may be made to select by displaying the route.

Next, the control unit 80 (route selection unit 86) selects a travel route according to the mode selected by the operator (S303). That is, the control unit 80 (route selection unit 86) selects the first travel route 91 when the operator selects the first mode, and the control unit 80 selects the second travel route 92 when the operator selects the second mode. The control unit 80 causes the transplanter 1 to start autonomous travel by transmitting an instruction to start autonomous travel, the selected route, and the like to the transplanter 1 (S304).

After the start of the autonomous travel, the control unit 80 determines whether or not a mode switching condition is satisfied (S305). The mode switching condition is a condition in which switching between the first mode and the second mode can be performed. The mode switching condition includes, for example, conditions that the transplanter 1 is not autonomously traveling, that the transplanter 1 and the wireless communication terminal 7 can communicate with each other, that two or more travel routes are stored in association with each other in the same field, and that no abnormality occurs.

Figure 11:
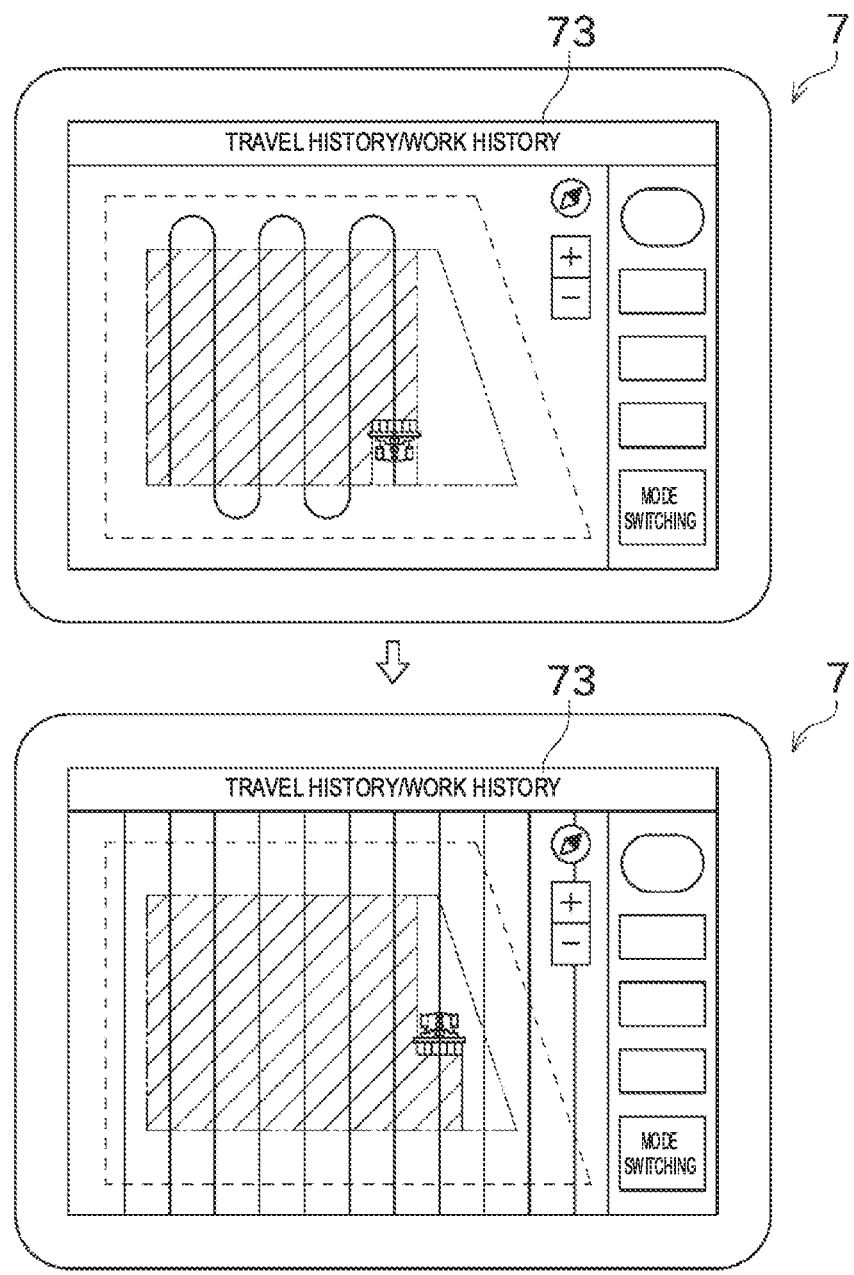
FIG. 11 is a diagram illustrating a screen displayed on a wireless communication terminal before and after mode switching.

When the control unit 80 determines that the mode switching condition is satisfied, the control unit 80 validates the mode switching button illustrated in FIG. 11 (S306). For example, when the mode switching condition is not satisfied, the mode switching button is grayed out and cannot be operated, and when the mode switching condition is satisfied, the mode switching button can be operated. Alternatively, the mode switching button may be displayed only when the mode switching condition is satisfied. Further, the mode switching button may be displayed on a top screen related to autonomous travel, or the mode switching button may be displayed on a setting screen displayed when a predetermined button is pressed.

The control unit 80 determines whether or not an instruction to change the mode is given (that is, whether or not the operator operates the mode switching button) (S307). When the control unit 80 determines that the mode change instruction is given, the control unit 80 performs the process of step S303 again. That is, the changed travel route is selected by the route selection unit 86, and autonomous travel is started.

Thus, by using the mode switching button, the mode can be changed by a simple operation. In particular, in this embodiment, the two travel routes are stored in association with each other, and therefore other travel routes associated with the same field can be automatically detected. Therefore, it is not necessary for the operator to select the corresponding travel route from the list of the travel routes. Further, the two travel routes are stored in association with each other in the same field, and therefore, for example, when a certain field is deleted, the related two travel routes can be deleted at once. In addition, it is possible to collectively display the travel routes created for a certain field, and therefore it is possible to easily confirm the travel routes.

Now, a travel history will be described with reference to FIG. 11. The travel history indicates an area in which the transplanter 1 travels along the travel route. In this embodiment, the area where the transplanter 1 travels and the work is performed is managed as a work history. Therefore, the work history is a kind of travel history. Whether or not the work is performed is determined on the basis of the operation of the work machine (for example, the operating state of the planting clutch).

Conventionally, the work history when travel along the first travel route 91 is performed, and the work history when travel along the second travel route 92 is performed are managed individually. However, both are work performed on the same field, and are preferably managed in a unified manner. In particular, in the transplanter 1, the remaining work area may be calculated from the work history, and a required seedling mat amount are sometimes calculated and prepared. Therefore, conventionally, it is necessary to calculate the required seedling mat amount by comparing the work history of the first travel route 91 with the work history of the second travel route 92, which is a great effort for the operator.

On the other hand, in this embodiment, both the work histories can be unified and managed. Further, the control unit 80 (display control unit 85) can display the travel route during travel and the work history on the display unit 73 in an overlapped manner. The upper diagram in FIG. 11 illustrates the work history before switching the travel route (during autonomous travel using the first travel route 91). The area marked with diagonal lines is the work history. The lower diagram of FIG. 11 illustrates the work history after switching the travel route (during autonomous travel using the second travel route 92). As illustrated in the lower diagram of FIG. 11, the work history before the switching of the travel route is displayed on the display unit 73 by the display control unit 85 even after the switching of the travel route. Thus, in this embodiment, the work history is inherited even when the travel route is switched, so that the work history can be appropriately managed. Therefore, for example, the required seedling mat amount can be easily calculated.

Further, in this embodiment, the work history is stored in association with the field instead of the travel route. Therefore, for example, when a process of deleting the work history is performed, the deletion of the work history is reflected regardless of which of the first travel route 91 and the second travel route 92 is used for autonomous travel.

As described above, the autonomous travel system 100 of this embodiment includes the first travel route creation unit 82, the second travel route creation unit 83, the interlocking route creation unit 84, the storage unit 81, the route selection unit 86, and the travel control unit 51. The first travel route creation unit 82 can create the first travel route 91 that is a travel route for allowing the transplanter 1 to travel in the field, and includes a plurality of the first straight routes 91*a* disposed at intervals so as to be within the field, and the turning routes 91*b* for connecting the first straight routes 91*a*. The second travel route creation unit 83 can create the second travel route 92 that is a travel route for allowing the transplanter 1 to travel in the field, and composed of a plurality of the second straight routes 92*a* disposed at intervals. The interlocking route creation unit 84 has at least one of a function of creating the second travel route 92 by creating the second straight routes 92*a* each having at least a part overlapped with the first straight route 91*a* in conjunction with the creation of the first travel route 91 by the first travel route creation unit 82, and a function of creating the first travel route 91 including the first straight routes 91*a* overlapped with the second straight routes 92*a* in conjunction with the creation of the second travel route 92 by the second travel route creation unit 83. The storage unit 81 stores the travel route created by the first travel route creation unit 82 or the second travel route creation unit 83, and the travel route created by the interlocking route creation unit 84 in association with each other. The route selection unit 86 selectively selects the first travel route 91 or the second travel route 92 in accordance with the input instruction. The travel control unit 51 autonomously causes the transplanter 1 to travel along at least a part of the first travel route 91 or the second travel route 92 selected by the route selection unit 86.

Consequently, the respective positions of the straight routes coincide with each other on the two travel routes, and therefore it is not necessary to adjust the positions of the travel routes. In addition, the two travel routes created in conjunction with each other are associated with each other, so that it becomes easy to manage these travel routes and apply the travel routes to the work vehicle. Further, when one travel route is created, the other travel route is automatically created, and therefore it is possible to reduce the trouble in creation of the travel route.

Further, in the autonomous travel system 100 of this embodiment, a process of creating the second travel route 92 by the interlocking route creation unit 84 in conjunction with the creation of the first travel route 91 by the first travel route creation unit 82 includes a process of extending the first straight routes 91*a* of the first travel route 91 to form the second straight routes 92*a*.

Consequently, the second travel route 92 can be created from the first travel route 91 by a simple process. In particular, when there is information necessary for creating the first travel route 91, the second travel route 92 can be created, so that the second travel route 92 can be automatically created without asking the user for additional input or the like.

Further, the autonomous travel system 100 of this embodiment includes the display unit 73 and the display control unit 85. The display unit 73 displays the travel route selected by the route selection unit 86 and the travel history of the transplanter 1. When the travel route selected by the route selection unit 86 is switched, the display control unit 85 merges the travel histories before and after the switching, and displays the merged travel histories on the display unit 73.

Consequently, even when the travel route is switched, the travel history of the entire field can be easily grasped.

Although the preferred embodiment of the present invention is described, the configurations as described above can be modified as described below, for example.

In the above embodiment, the interlocking route creation unit 84 has both the first interlocking function and the second interlocking function, but may be configured to have only one of the functions.

In the above embodiment, the travel history before switching the travel route and the travel history after switching the travel route are displayed in the same manner without distinction, but may be displayed, for example, in different colors.

DESCRIPTION OF REFERENCE NUMERALS

1 Transplanter (work vehicle)
50 Control unit
51 Travel control unit
80 Control unit
100 Autonomous travel system

The invention claimed is:

1. An autonomous travel system comprising:
 a first memory storing first processor-executable code;
 a first processor in communication with the first memory and configured to execute the first processor-executable code to perform first operations including:
  creating a first travel route and a second travel route based on second operations or third operations, wherein:
   the first travel route is a travel route for allowing a work vehicle to travel in a field, and includes:
    a plurality of first straight routes disposed within the field and at predetermined intervals relative to one another; and
    a turning route that connects adjacent first straight routes of the plurality of first straight routes;
   the second travel route is a travel route for allowing the work vehicle to travel in the field, and includes a plurality of second straight routes disposed at predetermined intervals relative to one another;
   the second operations include:
    creating the second travel route; and
    creating the first travel route by creating the plurality of first straight routes based on the second travel route such that the plurality of first straight routes are overlapped with the plurality of second straight routes; and the third operations include:
- creating the first travel route; and
- creating the second travel route by creating the plurality of second straight routes based on the first travel route such that each of the plurality of second straight routes has at least a part overlapped with the plurality of first straight routes;

storing the first travel route and the second travel route such that the first and second travel routes are associated with each other when stored;

selecting the first travel route or the second travel route in accordance with an input instruction;

a second memory storing second processor-executable code; and a second processor configured to execute the second processor-executable code to perform fourth operations to cause the work vehicle to autonomously travel along at least a part of the first travel route or the second travel route that is selected.

2. The autonomous travel system according to claim 1, wherein creating the plurality of second straight routes based on the first travel route includes a process of extending the first straight routes of the first travel route to form the second straight routes.

3. The autonomous travel system according to claim 1, further comprising a display, wherein the first operations further include:
- displaying the travel route selected and a first travel history of the work vehicle associated with the travel route selected on the display,
- switching, subsequent to displaying the travel route selected and the first travel history on the display, the travel route selected to the other of the first or second travel route, merging the first travel history and the other of the first or second travel route, and
- displaying the merged first travel history and the other of the first or second travel route on the display.

4. The autonomous travel system according to claim 2, further comprising a display, wherein the first operations further include:
- displaying the travel route selected and a first travel history of the work vehicle associated with the travel route selected,
- switching, subsequent to displaying the travel route selected and the first travel history on the display, the travel route selected to the other of the first or second travel route,
- merging the first travel history and the other of the first or second travel route, and
- displaying the merged first travel history and travel route on the display.

5. The autonomous travel system according to claim 1, comprising a wireless communication terminal that includes the first memory and the first processor.

6. The autonomous travel system according to claim 5, wherein the wireless communication terminal includes a computer, smartphone, or tablet.

7. The autonomous travel system according to claim 1, wherein the second processor is configured to be in communication with the first processor over a network.

8. The autonomous travel system according to claim 1, wherein the work vehicle includes the second memory and the second processor.

9. The autonomous travel system according to claim 1, wherein the work vehicle is a planter.

* * * * *